United States Patent [19]

Hutchison

[11] Patent Number: 5,004,407
[45] Date of Patent: Apr. 2, 1991

[54] METHOD OF SCAVENGING AIR AND OIL AND GEAR PUMP THEREFOR

[75] Inventor: Richard M. Hutchison, New London, Wis.

[73] Assignee: Sundstrand Corporation, Rockford, Ill.

[21] Appl. No.: 412,341

[22] Filed: Sep. 26, 1989

[51] Int. Cl.⁵ .......................... F04C 2/18; F04C 15/02
[52] U.S. Cl. .......................................... 418/1; 418/9;
418/15; 418/199; 418/DIG. 1; 184/6.23;
55/52; 55/202; 55/203; 210/787
[58] Field of Search .............. 418/1, 9, 15, 199, 200,
418/206, DIG. 1; 417/310; 184/6.23, 6.2;
55/203, 202, 1, 52; 210/787, 512.2

[56] References Cited

U.S. PATENT DOCUMENTS

| | | | |
|---|---|---|---|
| 1,214,300 | 1/1917 | Grouvelle | 418/9 |
| 1,477,850 | 12/1923 | Pool . | |
| 2,108,771 | 2/1938 | Laird | 418/9 |
| 2,350,877 | 6/1944 | Cornelius | 418/15 |
| 2,458,452 | 1/1949 | Vanni . | |
| 2,503,016 | 4/1950 | Weeks et al. | 184/6.23 |
| 2,578,275 | 12/1951 | Whiteman | 184/6.23 |
| 2,619,911 | 12/1952 | Svenson . | |
| 3,015,283 | 1/1962 | Knipp | 418/15 |
| 3,137,234 | 6/1964 | Mosbacher . | |
| 3,242,867 | 3/1966 | Mosbacher . | |
| 3,267,862 | 8/1966 | Mosbacher | 418/15 |
| 3,526,470 | 9/1970 | Swanson . | |
| 4,480,970 | 11/1984 | Smith | 418/15 |
| 4,631,009 | 12/1986 | Cygnor et al. | 418/15 |
| 4,697,995 | 10/1987 | Tuckey | 418/15 |

Primary Examiner—John J. Vrablik
Assistant Examiner—David L. Cavanaugh
Attorney, Agent, or Firm—Antonelli, Terry, Stout & Kraus

[57] ABSTRACT

A method of scavenging air and oil from a component (3) of an aircraft for returning the oil to a reservoir (4) for recirculation to the component involves the use of a gear pump (1) for scavenging the oil and gas. The gear pump centrifugally separates oil from the air and returns only the separated oil to the reservoir through outlets located upstream of the mesh zone of the gears while the air is discarded whereby lower discharge pressure of the gear pump is attained and there is no longer a need for a separate air-oil separator.

15 Claims, 1 Drawing Sheet

METHOD OF SCAVENGING AIR AND OIL AND GEAR PUMP THEREFOR

TECHNICAL FIELD

The present invention is directed to a method of separating a liquid containing a gas from the gas and a gear pump useful in practicing the method. Particularly, the method has applicability for scavenging air and oil from a component of an aircraft for returning the oil to a reservoir for recirculation to the component.

BACKGROUND ART

Aircraft lubrication and scavenge systems provide oil for lubrication of aircraft components. The oil is scavenged through the use of pumps which return the oil to a reservoir for recirculation. The oil scavenged by the pumps can have a high air content in an air-oil mixture. Before recirculating the oil from the main reservoir it is preferred to remove the air from the air-oil mixture to avoid plugging and slugging, e.g. pressure pulsations and slugs of air, then slugs of oil in the fluid provided to the aircraft components. These pressure fluctuations can cause damage to the aircraft components. Cooling with oil is also more effective than with an air-oil mixture, as in an heat exchanger, for example.

It is known to employ gear pumps for scavenging the air-oil mixture in aircraft lubrication and scavenge systems before returning the oil to a reservoir for recirculation. In these known systems an air-oil separator is employed downstream from the gear pump for removing air. These gear pumps are required to pump various air-oil ratios at pressure ratios ranging anywhere from 1 to over 50. At the higher pressure ratios the carryover and leakage of air from discharge to inlet of the pump degrades the inlet vacuum and partially fills the potential volume of the pump. One of the reasons for high discharge pressure in these pumps is the necessity to run the two phase mixture through an air-oil separator.

It has been recognized that in gear pumps having intermeshing gears which are used to pump aerated liquid, liquids containing gases or emulsions of liquids and gases, that the liquids are centrifuged to the perimeter of the gears and the gaseous phase becomes trapped in a void formed at the delivery side of the pump in the lee of the intermeshing gears. To prevent the entrapped gas from becoming highly compressed and being forced through the intermeshing gears back to the inlet side of the pump at extremely high velocities, it is proposed in U.S. Pat. No. 4,480,970 to provide a vent pipe at the outlet side of the pump close to the nip of the intermeshing gears. However, this known arrangement does not prevent return of a portion of the air to the reservoir or eliminate the need for a separate air-oil separator downstream of the gear pump.

Rotary positive displacement type pumping apparatus for centrifugal separation of liquid and gaseous fluids are, per se, known as disclosed in U.S. Pat. Nos. 3,137,234 and 3,242,867. U.S. Pat. No. 2,619,911 discloses a pump with intermeshing gears for centrifugal separation. An addition of supercharged liquid is employed to forcibly exhaust air and accumulated vapor from the inner portion of the interdental space or pocket.

U.S. Pat. Nos. 1,477,850; 2,180,771; and 2,458,452 disclose examples of serially arranged pumps wherein the downstream pump is of less capacity than the upstream pump and also the use of relief valve between the pumps in order to divert excess fluid flow. U.S. Pat. Nos. 3,526,470; 4,631,009; and 4,697,995 further show the state of the art.

DISCLOSURE OF INVENTION

An object of the present invention is to provide an improved method of separating a liquid containing a gas, whether in the form of an aerated liquid, an emulsion of the liquid and the gas, a mixture or otherwise, from the gas in a gear pump comprising a pair of intermeshing gears which avoids the aforementioned disadvantages of the known gear pumps. More particularly, an object of the invention is to provide an improved method of scavenging air and oil from a component of an aircraft for returning the oil to a reservoir for recirculation to the component which advantageously utilizes the innate centrifugal separation of the two phases within the gear teeth of the external gear pump for separating oil from the gas and directing only the separated oil to the downstream reservoir thereby eliminating the need for a separate air-oil separator.

A further object of the invention is to provide an improved gear pump which is capable of pumping various gas-liquid ratios with a reduced pressure rise across the pump. In particular, an object of the invention is to provide an improved two stage external gear pump for phase separation of liquid and gas which can advantageously be used in an aircraft lubrication and scavenge systems, for example.

These and other objects of the invention are attained by the improved gear pump of the invention which comprises first and second intermeshing gears capable of being rotatably driven for pumping a liquid. The gears are arranged in a housing which includes an inlet for communicating the gear pump with a source of liquid which may contain a gas. The rotation of the intermeshing gears and the resulting centrifugal force on the liquid being pumped causes separation of liquid from the gas where the liquid supplied to the gear pump through the inlet contains a gas. The housing further includes first outlet means located upstream of a mesh zone of the gears for discharging only liquid which has been separated from the gas when the liquid supplied to the gear pump contains a gas, and second outlet means for discharging gas and any remaining liquid.

The second outlet means in the disclosed, preferred embodiment is located in the housing adjacent a mesh zone on the lee side of the intermeshing gears, on a side of the gears opposite the inlet. The first outlet means is located in the housing intermediate the second outlet means and the inlet. Particularly, first and second discharge ports of the first outlet means are provided in the housing adjacent the periphery of the first and second intermeshing gears, respectively, at locations upstream with respect to the travel directions of the gears and the liquid pumped thereby from the mesh zone of the gears and the second outlet means. First and second discharge lines extend from the first and second discharge ports, respectively, in directions which are generally tangential to the outer periphery of the associated gear and adjacent housing as seen in a cross section of the gear pump taken perpendicular to the axes of rotation of the first and second gears. As a result of this arrangement, the centrifugal acceleration and tangential velocity of the liquid which has been separated from the gas is utilized to displace it from the intermeshing gears into the discharge lines.

The disclosed preferred embodiment of the gear pump is a two stage external gear pump comprising the aforementioned first and second intermeshing gears as a first gear stage and, as a second gear stage, third and fourth intermeshing gears capable of being rotatably driven for pumping a liquid and centrifugally separating liquid from gas where the liquid supplied to the second stage contains a gas. A housing about the third and fourth intermeshing gears includes a second stage inlet, a third outlet means located upstream of a mesh zone of the third and fourth intermeshing gears for discharging only liquid which has been separated from the gas when the liquid supplied to the second stage inlet contains a gas, and fourth outlet means for discharging gas and any remaining liquid. Means are also provided for communicating the second stage inlet with the second outlet means of the first stage of the gear pump. The size of the second gear stage is approximately one-fourth to one-third that of the first gear stage formed by the first and second intermeshing gears. A relief valve is provided in the means communicating the second stage inlet with the second outlet means to allow release of excess liquid supplied from the second outlet means which cannot be pumped by the second stage.

The fourth outlet means is located in the housing of the second gear stage adjacent a mesh zone of the third and fourth intermeshing gears on a side of the gears opposite to that of the second stage inlet. The third outlet means is located in the housing intermediate the fourth outlet means and the second stage inlet. Preferably, the third outlet means comprises third and fourth liquid discharge ports located adjacent the periphery of the third and fourth intermeshing gears, respectively, at locations upstream with respect to the travel directions of the gears and the liquid pumped thereby from the mesh zone of the third and fourth gears and the fourth outlet means. Third and fourth discharge lines extend from the third and fourth discharge ports, respectively, in directions which are generally tangential to the outer periphery of the associated gear and adjacent housing as seen in the cross section of the gear pump taken perpendicular to axis of rotation of the third and fourth intermeshing gears as in the first stage of the gear pump.

Further, the invention comprises a system for scavenging a liquid which may contain a gas wherein the gear pump of the invention is employed to scavenge a liquid which may contain a gas from the apparatus so that the liquid can be recirculated to the apparatus. The system according to the invention comprises a liquid reservoir and means defining a fluid path for conveying liquid scavenged from an apparatus to the reservoir. The means defining a fluid path includes a gear pump of the invention with the inlet means of the gear pump being in fluid communication with the apparatus for scavenging liquid and gas and the first outlet means of the gear pump being in fluid communication with the reservoir for returning liquid which has been separated from gas to the reservoir. The second outlet means is connected to means for discarding the gas from the fluid path means. According to the disclosed embodiment, the second outlet means is connected to the means for discarding via a second gear stage of the gear pump. In the preferred form of the invention the system is an aircraft system for scavenging oil and air for recirculation of the oil for lubrication of a component of the aircraft.

Thus, a method of separating a liquid containing a gas from the gas according to the invention comprises pumping the liquid containing gas through a gear pump comprising a pair of intermeshing gears so that at least a portion of the liquid is centrifugally separated within the pump from the gas, and separately discharging the separated liquid and the gas with any remaining liquid from the gear pump, the separated liquid being discharged from within the pump housing at a location upstream of a mesh zone of the intermeshing gears.

More particularly, a method of scavenging air and oil from a component of an aircraft for returning the oil to a reservoir for recirculation to the component according to the invention comprises the steps of pumping oil and air from the component using a gear pump, centrifugally separating oil from the air in the gear pump and returning only oil which has been separated from the air to the reservoir from the gear pump. The gear pump is a two stage gear pump where only oil which is centrifugally separated from air in each stage is returned to the reservoir as discussed above.

These and other objects, features and advantages of the present invention will become more apparent from the following description when taken in connection with the accompanying drawings, which show, for purposes of illustration only, one preferred embodiment in accordance with the present invention.

BEST MODE FOR CARRYING OUT THE INVENTION

Figure 1:
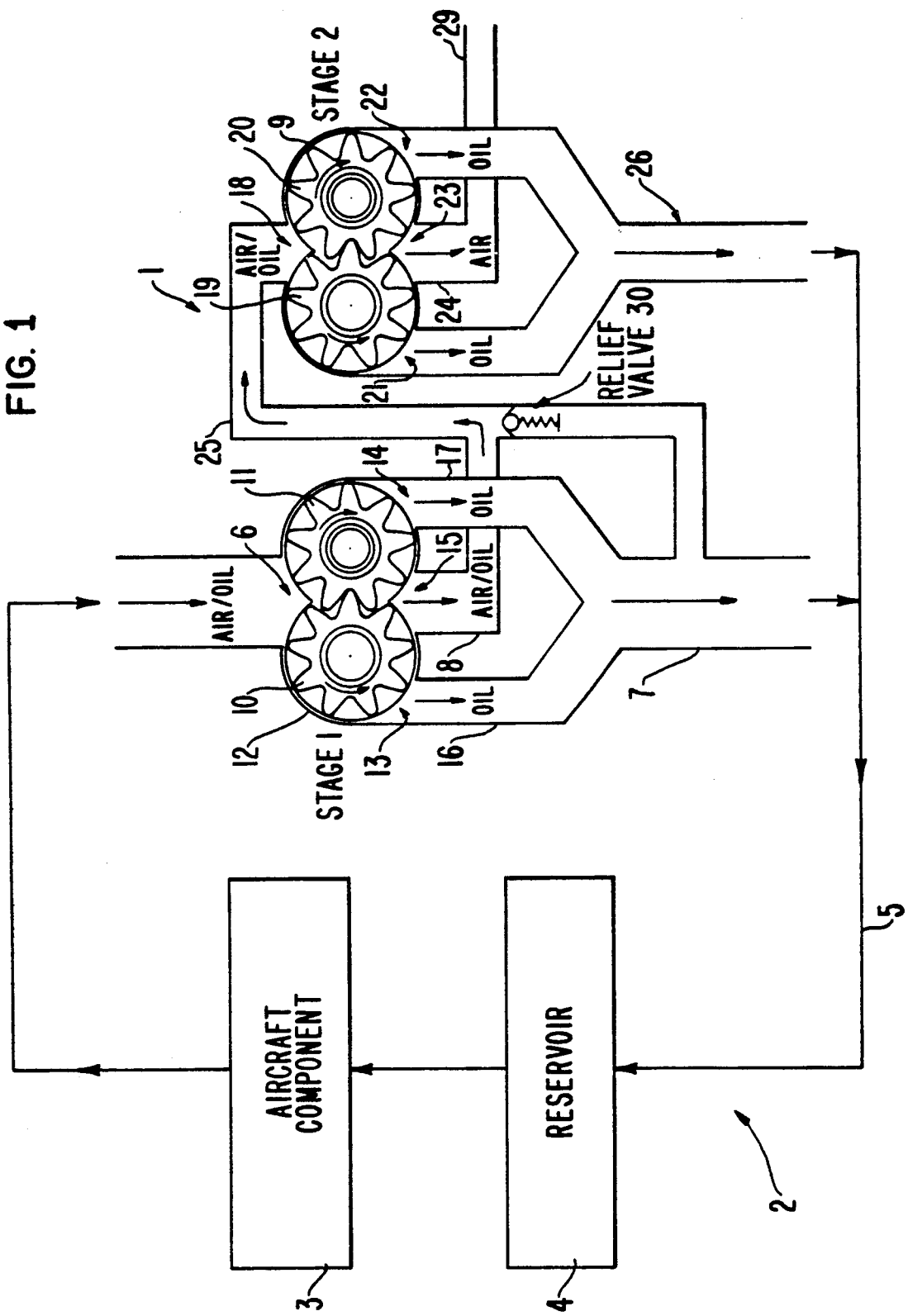
FIG. 1 is a schematic, cross sectional view of a gear pump according to a preferred embodiment of the invention shown in combination with an aircraft lubrication and scavenge system for lubricating an aircraft component.

Referring now to the drawings a gear pump 1 according to the invention is shown in an aircraft lubrication and scavenge system 2 for scavenging air and oil from an aircraft component 3 and returning it to a reservoir 4 for recirculation to the aircraft component. The system 2 comprises the reservoir 4 and also a fluid pass sage 5 for conveying fluid scavenged from the aircraft component 3. The fluid passage 5 includes the gear pump 1. Particularly, an inlet 6 of a first stage of the gear pump is in fluid communication with the aircraft component 3 for scavenging liquid and air from the component. A first outlet 7 of the gear pump is in fluid communication with the reservoir 4 for returning to the reservoir only liquid which has been separated from gas in the gear pump as discussed below. A second outlet 8 of stage one of the gear pump discards the air from the gear pump and the fluid passage 5 by way of a discharge line 25.

The gear pump 1 of the invention comprises as a first gear stage, first and second intermeshing gears 10 and 11 which have conventional gear tooth profiles and are mounted in bearings, not shown, so that they can be rotatably about their respective axis shown in end view in FIG. 1, by motive power from an aircraft engine in a conventional manner. The gear pump 1 includes a housing 12 about the first and second intermeshing gears 10 and 11. The housing 12 is formed with the inlet 6 communicating the gear pump with the source of liquid which may contain a gas, namely aircraft component 3 from which oil and air is scavenged. Upon rotation of the intermeshing gears 10 and 11, the resulting centrifugal force on a liquid containing a gas being pumped causes separation of liquid from the gas, in this case separation of oil from the air.

The housing 12 also has, as first outlet means discharge ports 13 and 14 which are located upstream of a mesh zone 15, of the gears for discharging only oil which has been separated from air by the centrifugal action in the first stage of the pump. That is, by locating the discharge ports in the housing 12 upstream of the mesh zone 15 and withdrawing air any remaining oil from second inlet, adjacent the mesh zone, the centrifugal acceleration and tangential velocity of the oil is utilized to displace it from the gear pump through the discharge ports 13 and 14 before it has an opportunity to recombine or become intermixed with air in the vicinity of the mesh zone 15 and the second outlet 8. The discharge ports 13 and 14 are located adjacent the periphery of the respective intermeshing gears 10 and 11 where they communicate respectively with first and second discharge lines 16 and 17. The discharge lines 16 and 17 extend in directions which are generally tangential to the outer periphery of the associated gear and adjacent housing as seen in the cross section of the gear pump in FIG. 1 which is taken perpendicular to the axes of rotation of the intermeshing gears 10 and 11.

During operation of the gear pump 1, scavenged air and oil travels through the fluid passage 5, which may be a pipe, for example, to the inlet 6 of the gear pump. The air-oil mixture is then carried from the inlet 6 to the discharge ports 13 and 14 of the first stage of the gear pump. While the two phase mixture is in the first stage of the gear pump, separation of the phases due to centrifugal effects occurs. The oil, being the more dense of the two phases, moves to the outside diameter of the gears. As noted above, because the discharge ports 13 and 14 open in the circumferential surface of the housing facing the gears at locations upstream from the mesh zone 15 where the air can be removed via second outlet 8, the centrifugal acceleration and tangential velocity of the separated oil is utilized to displace it through the discharge ports from where it passes through the discharge lines 16 and 17 and back to the oil reservoir 4 through large lines of fluid passage 5 to avoid pressure rise.

Depending upon the air-oil ratio entering the pump, it may not be possible to remove all of the oil from the mixture in the first gear stage. Whatever remains in the gear teeth continues around to the mesh zone 15 and the second outlet 8 of the first stage of the gear pump. At this point the air-oil ratio has been increased significantly. This remaining fluid is discharged through the gear meshing action. The second outlet 8 feeds directly into the inlet 18 of the second gear stage 9. The second gear stage is approximately one-fourth to one third the size of the first gear stage.

The second gear stage 9 comprises third and fourth intermeshing gears 19 and 20 which are capable of being rotatably driven for pumping the fluid from the first stage of the pump and centrifugally separating liquid from the gas therein. The gears 19 and 20 of the second stage are also located within a housing, which may be the same housing 12 for the first gear stage of the pump or a different housing. The housing for the second stage includes the inlet 18, third outlet means in the form of discharge ports 21 and 22 located upstream of a mesh zone 23 of the third and fourth intermeshing gears 19 and 20 for discharging only oil which has been separated from air, and fourth outlet means 24 for discharging air and any remaining oil from the vicinity of the mesh zone 23. A fluid passage 25 communicates the second stage inlet 18 with the second outlet 8 of the first stage of the gear pump.

The low inlet pressure generated at the inlet 18 of the second gear stage 9 advantageously limits the discharge pressure in the region of the second outlet 8 of the first gear stage thereby reducing the pressure rise across the first stage of the pump and subsequently improving its performance. In addition, the second gear stage is identical in operation to the first gear stage and hence aids in separating any remaining oil from the air-oil mixture entering its inlet 18. Oil discharge ports 26 and 7 return oil which has been separated from air to the reservoir 4 while the near 100 percent air at discharge port 28 is discarded by way of the discharge line 29.

A relief valve 30 is included in the passage 25 interconnecting the second outlet 8 of the first gear stage with the inlet 18 of the second gear stage. The relief valve allows solid oil operation. When actuated, the excess solid oil flow from the first stage which the second stage cannot handle is directed back to the reservoir 4.

From the foregoing description of the gear pump and aircraft lubrication and scavenge system, it can be seen that the method of the invention for scavenging air and oil from a component of an aircraft for returning the oil to a reservoir for recirculation comprises the steps of pumping oil and air from the component using a gear pump, centrifugally separating oil from the air in the gear pump and returning only oil which has been separated from the air to the reservoir from the gear pump. In the preferred form of the method, the gear pump is a two stage gear pump where only oil which is centrifugally separated from air in each stage is returned to the reservoir. With the system and method of the invention, there is no need for an air-oil separator downstream of the gear pump whereby the discharge pressure across the gear pump can be reduced as compared with the known scavenge systems.

While I have shown and described one embodiment in accordance with the present invention, it is understood that the same is not limited thereto, but is susceptible to numerous changes and modifications as known to those skilled in the art. For example, the gear pump of the invention could be used to separate liquid and gas other than oil and air as in the disclosed scavenged system. Therefore, I do not wish to be limited to the details shown and described herein, but intend to cover all such changes and modifications as are encompassed by the scope of the appended claims.

What is claimed is:

1. A gear pump comprising first and second intermeshing gears capable of being rotatable driven for pumping a liquid, means for housing said first and second intermeshing gears, said housing means including inlet means for communicating the gear pump with a source of liquid which may contain a gas, the rotation of the intermeshing gears and the resulting centrifugal force on the liquid being pumped causing separation of liquid from the gas where the liquid supplied to the gear pump through said inlet means contains a gas, wherein said housing means further includes first outlet means for discharging only liquid which has been separated from the gas when the liquid supplied to the gear pump contains a gas, and second outlet means for discharging gas and any remaining liquid, wherein said second outlet means in located in said housing means adjacent a mesh zone of the inter meshing gears on a side of the gears opposite to that of the inlet means, and wherein said first outlet means is located in said housing means intermediate said second outlet means and said inlet means such that the first outlet means is located upstream with respect to the travel direction of the gears and the liquid pumped thereby from the mesh zone of the gears and said second outlet means.

2. A gear pump according to claim 1, wherein said first outlet means comprises first and second liquid discharge ports located adjacent the periphery of the first and second intermeshing gears, respectively, at locations upstream with respect to travel direction of the gear and the liquid pumped from the mesh zone of the gears and said second outlet means.

3. A gear pump according to claim 2, wherein first and second discharge lines extend, respectively, from said first and second discharge ports in directions which are generally tangential to the outer periphery of the associated gear and adjacent housing means and in directions of the tangential velocity of centrifugally separated liquid as seen in a cross section of the gear pump taken perpendicular to axes of rotation of the first and second gears.

4. A gear pump according to claim 1, wherein said first and second intermeshing gears are a first gear stage of said pump which further comprises as a second gear stage of said pump third and fourth intermeshing gears capable of being rotatably driven for pumping a liquid and centrifugally separating liquid from gas where the liquid supplied to the second stage contains a gas, means for housing said third and fourth intermeshing gears which includes a second stage inlet, third outlet means located upstream of a mesh zone of the third and fourth intermeshing gears for discharging only liquid which has been separated from the gas when the liquid supplied to the second stage inlet contains a gas and fourth outlet means for discharging gas and any remaining liquid, and wherein means are provided for communicating the second stage inlet with said second outlet means.

5. A gear pump according to claim 4, wherein a relief valve is provided in the means communicating the second stage inlet with the second outlet means to allow release of excess liquid supplied from said second outlet means which cannot be pumped by said second stage.

6. A gear pump according to claim 4, wherein said second gear stage is approximately one-fourth to one-third the size of the first gear stage formed by said first, and second intermeshing gears.

7. A gear pump according to claim 4, wherein said fourth outlet means is located in the second gear stage housing means adjacent a mesh zone of the third and fourth intermeshing gears on a side of the gears opposite to that of the second stage inlet.

8. A gear pump according to claim 7, wherein said third outlet means is located in said second gear stage housing means intermediate said fourth outlet means and said second stage inlet.

9. A gear pump according to claim 8, wherein said third outlet means comprises third and fourth liquid discharge ports located adjacent the periphery of the third and fourth intermeshing gears, respectively, at locations upstream with respect to the travel directions of the gears and the liquid pumped thereby from the mesh zone of the third and fourth gears and said fourth outlet means.

10. A gear pump according to claim 9, wherein third and fourth discharge lines extend from said third and fourth discharge ports, respectively, in directions which are generally tangential to the outer periphery of the associated gear and adjacent housing means and in the directions of the tangential velocity of centrifugally separated liquid as seen in a cross section of the gear pump taken perpendicular to axes of rotation of the third and fourth intermeshing gears.

11. A system for scavenging a liquid which may contain a gas, comprising an apparatus through which liquid can be circulated, a liquid reservoir and means defining a fluid path for conveying liquid scavenged from said apparatus to the reservoir, wherein said means defining a fluid path includes a gear pump comprising first and second intermeshing gears capable of being rotatably driven for pumping a liquid, means for housing said first and second intermeshing gears, said housing means including an inlet means for communicating the gear pump with a source of liquid which may contain a gas, the rotation of the intermeshing gears and the resulting centrifugal force on the liquid being pumped causing separation of liquid from the gas where the liquid supplied to the gear pump through said inlet means contains a gas, wherein said housing means further includes first outlet means for discharging only liquid which has been separated from the gas when the liquid supplied to the gear pump contains a gas, and second outlet means for discharging gas and any remaining liquid, wherein said second outlet means in located in said housing means adjacent a mesh zone of the intermeshing gears on a side of the gears opposite to that of the inlet means, and wherein said first outlet means in located in said housing means intermediate said second outlet means and said inlet means such that the first outlet means is located upstream with respect to the travel direction of the gears and the liquid pumped thereby from the mesh zone of the gears and said second outlet means, the inlet means of said gear pump being in fluid communication with the apparatus for scavenging liquid therefrom and the first outlet means of said gear pump being in fluid communication with said reservoir for returning liquid which has been separated from gas to the reservoir.

12. The system according to claim 11, wherein said second outlet means is connected to means for discarding the gas from said fluid path means.

13. The system according to claim 12, wherein said second outlet means is connected to said means for discarding via a second gear stage of the gear pump.

14. The system according to claim 11, wherein said apparatus is a component of an aircraft, said system scavenging oil for recirculation of the oil for lubrication of the apparatus.

15. A method of separating a liquid containing a gas from the gas, comprising pumping the liquid containing gas through a gear pump comprising a pair of intermeshing gears so that at least a portion of the liquid is centrifugally separated within the pump from the gas, and separately discharging the separated liquid and the gas with any remaining liquid from the gear pump with said separated liquid being discharged at a location upstream of a mesh zone of the intermeshing gears and in a direction of the tangential velocity of the centrifugally separated liquid.

* * * * *